United States Patent [19]
Ishihama et al.

[11] Patent Number: 5,560,204
[45] Date of Patent: Oct. 1, 1996

[54] COMPENSATION SYSTEM FOR HYDRAULIC CIRCUIT OF HYDRAULICALLY DRIVEN VEHICLE FOR STRAIGHT TRAVELING

[75] Inventors: Kazuyoshi Ishihama; Kazunori Ikei, both of Kanagawa, Japan

[73] Assignee: Kabushiki Kaisha Komatsu Seisakusho, Japan

[21] Appl. No.: 374,550

[22] PCT Filed: Aug. 3, 1993

[86] PCT No.: PCT/JP93/01088

§ 371 Date: Jan. 20, 1995

§ 102(e) Date: Jan. 20, 1995

[87] PCT Pub. No.: WO94/03343

PCT Pub. Date: Feb. 17, 1994

[30] Foreign Application Priority Data

Aug. 4, 1992 [JP] Japan .................................. 4-226499

[51] Int. Cl.⁶ ................................................. F16D 31/02
[52] U.S. Cl. ............................. 60/426; 60/494; 91/515; 91/532; 180/6.48
[58] Field of Search ........................... 91/514, 515, 517, 91/532; 60/422, 426, 494; 180/6.48

[56] References Cited

U.S. PATENT DOCUMENTS

| | | | |
|---|---|---|---|
| 4,769,991 | 9/1988 | Johnson | 60/426 |
| 5,063,739 | 11/1991 | Bianchetti et al. | 60/421 |
| 5,138,837 | 8/1992 | Obertrifter et al. | 91/446 |

FOREIGN PATENT DOCUMENTS

| | | | |
|---|---|---|---|
| 50-20671 | 7/1975 | Japan . | |
| 58-192129 | 12/1983 | Japan . | |
| 61-245 | 1/1986 | Japan . | |
| 63-268 | 1/1988 | Japan . | |
| 354077 | 3/1991 | Japan . | |
| 244604 | 9/1992 | Japan | 60/452 |
| 530503 | 4/1993 | Japan . | |

Primary Examiner—F. Daniel Lopez
Attorney, Agent, or Firm—Ronald P. Kananen

[57] ABSTRACT

A compensation system for a hydraulic circuit of a hydraulically driven vehicle for straight traveling, with left and right traveling valves having load detection ports; left and right pressure compensation valves arranged in respective pressurized fluid supply passages between a fluid pressure source and the traveling valves; and a by-pass passage for connecting together the load pressure detecting ports of the left and right traveling valves. There may be an on–off valve in the by-pass passage.

12 Claims, 5 Drawing Sheets

5,560,204

COMPENSATION SYSTEM FOR HYDRAULIC CIRCUIT OF HYDRAULICALLY DRIVEN VEHICLE FOR STRAIGHT TRAVELING

FIELD OF THE INVENTION

The present invention relates to a compensation system for a hydraulic circuit supplying pressurized fluid for left and right traveling hydraulic motors of a hydraulically driven vehicle in order to effect compensation for straight traveling.

BACKGROUND ART

In the prior art, there are various hydraulic circuits for hydraulically driven vehicles that have been employed mainly for constructional vehicles, work implements and so forth. FIG. 1 shows one example of such a hydraulic circuit for a hydraulically driven vehicle. The shown hydraulic circuit is constructed by connecting discharge output passage 2 of a hydraulic pump 1 to inlet ports 5a and 6a of left and right traveling valves 5 and 6 via left and right pressure compensation valves 3 and 4, connecting outlets of respective left and right traveling valves 5 and 6 to left and right traveling hydraulic motors 7 and 8 and connecting the inlets of the left and right traveling valves 5 and 6 through a by-pass passage 9.

With such a hydraulic circuit, compensation for straight traveling can be done by establishing communication between the inlets of the left and right traveling valves 5 and 6. However, when opening area is differentiated due to tolerance in machining of cut-outs of metering portions of the left and right traveling valves 5 and 6, fluid amounts to be supplied to the respective left and right traveling hydraulic motors 7 and 8 may be differentiated so that precision in compensation for straight traveling can be degraded.

The problem may be solved by connecting a left side fluid line 10 connected to the left side traveling valve 5 and the left side traveling hydraulic motor 7 to a right side fluid line 11 connected to the right side traveling valve 6 and the right side traveling hydraulic motor 8. However, in such construction, since there are respectively two left side fluid lines 10 and right side fluid lines 11, two by-pass passages become necessary, which are disadvantageous in viewpoint of cost and space.

CONSTRUCTION OF THE INVENTION

Therefore, it is an object of the present invention to provide a compensation system for a hydraulic circuit of a hydraulically driven vehicle for straight traveling, which can solve the above-mentioned problem.

More specifically, it is an object of the present invention to provide a compensation system for a hydraulic circuit of a hydraulically driven vehicle for straight traveling, which can equalize hydraulic supply pressure for hydraulic motors for driving to travel without requiring a plurality of by-pass passages.

In order to accomplish the above-mentioned and other objects, according to the first aspect of the present invention, a compensation system for a hydraulic circuit of a hydraulically driven vehicle for straight traveling, comprises:

left and right traveling valves connected to a pressurized fluid source at the inlet side via left side and right side pressurized fluid supply passages, connected to left and right hydraulic traveling motors at the outlet sides and having load detection ports;

left and right pressure compensation valves arranged in respective pressurized fluid supply passages between the fluid pressure source and the traveling valves and having check valve portions for establishing and blocking communication between the fluid pressure source and the left and right traveling valves, and a pressure reduction valve portion for lowering supply pressure supplied from the fluid pressure source, the check valve portion being constructed to be applied an inlet pressure in a communication establishing direction and output pressure in a communication blocking direction, the pressure reduction valve portion being contacted with the check valve portion by a spring, the pressure of one of pressure chambers being applied for establishing communication between the inlet side and the outlet side and to shift the pressure reduction valve portion in a direction away from the check valve portion, and apply the pressure of the other pressure chamber being applied for blocking communication between the inlet side and the outlet side and to shift the pressure reduction valve portion in blocking direction of the check valve portion;

load pressure detecting passage for connecting one of the pressure chambers of the left side pressure compensation valve to a load pressure detecting port of the left side traveling valve and for connecting one of the pressure chambers of the right side pressure compensation valve to a load detecting port of the right side traveling valve; and by-pass passage for connecting the load pressure detecting ports of the left and right traveling valves.

Preferably, an opening and closing valve is provided in the by-pass passage for controlling, establishing and blocking of communication between the load pressure detecting ports.

According to the second aspect of the invention, a compensation system for a hydraulic circuit of a hydraulically driven vehicle for straight traveling, in a pressurized fluid supply system for the hydraulically driven vehicle provided with a plurality of pressure compensation valves connected to a pump discharge line of a hydraulic pump in parallel, traveling valves connected to outlet side of respective pressure compensation valves being connected to left and right hydraulic driving motors for supplying pressurized fluid respectively, the system comprises:

the pressure compensation valve being construed with a check valve portion for communicating and blocking between a pump discharge line and inlet port of the traveling valve and a pressure reducing portion for reducing pump discharge pressure;

the check valve portion being constructed to be moved in valve opening direction by an inlet pressure and in valve closing direction by an outlet pressure;

the pressure reducing valve being contacted with the check valve portion by means of a spring, responsive to a pressure in one of pressure chambers to establish communication between the inlet side and outlet side and to be biased in a direction away from the check valve and responsive to a pressure in the other pressure chamber to block communication between inlet side and outlet side and to bias the check valve portion in valve closing direction; and one of the pressure chambers of the left side pressure compensation valve being connected to a load pressure detecting port of the left side traveling valve, one of the pressure chambers of the right side pressure compensation valve being connected to a load pressure detecting port of the right side traveling valve and, the load pressure detecting ports of the left and right traveling valves being connected by a by-pass passage.

According to the third aspect of the invention, a compensation system for a hydraulic circuit of a hydraulically driven vehicle for straight traveling comprising:

a valve block;

left and right traveling valves constructed by forming spool bores, check valve receptacle bores and reduction valve receptacle bores in the valve block, forming pump port, first and second load pressure detecting ports, first and second actuator ports and first and second tank ports opening to each of the spool bores, and slidably disposing main spools in the spool bores for selectively establishing and blocking communication between respective ports;

check valve portions each being formed by forming a first port opening to the check valve receptacle bore and a fluid passage for communicating the check valve receptacle bore with the pump port in the valve block, and inserting a spool in the check valve receptacle bore for establishing and blocking communication between the first port and the fluid passage and stopping at the blocking position;

pressure reduction valve portions each being formed by forming second and third ports opening to the pressure reducing valve receptacle bore, forming first and second pressure chambers opposing to both ends of a spool disposed in the pressure reducing valve receptacle bore, communicating the first pressure chamber with the second load pressure detecting port, communicating the second pressure chamber with the third port, and contacting the spool received within the pressure reducing valve receptacle bore with the check valve portion and biasing the same in valve closing direction of the check valve portion;

pressure compensation valves each being formed by the check valve portion and the pressure reducing valve portion;

the spool of the pressure reducing valve portion being formed into a configuration for establishing communication between the first pressure chamber and the second port when it is slide against the spring force of the spring by the pressure of the first pressure chamber;

one of the pressure chambers of the left side pressure compensation valve being connected to the load pressure detecting port of the left side traveling valve, one of the pressure chambers of the right side pressure compensation valve being connected to the load pressure detecting port of the right side traveling valve and the load pressure detecting ports being connected through a by-pass passage.

According to the fourth aspect of the present invention, in a pressurized fluid supply system for distributing pressurized fluid supplied from a pressurized fluid source to supply first and second line pressures to at least a first hydraulic load and a second hydraulic load, a compensation system for a hydraulic circuit of a hydraulically driven vehicle for straight traveling comprises:

first valve means for supplying the first line pressure to the first hydraulic load;

second valve means for supplying the second line pressure to the second hydraulic load;

first load pressure induction means connected to the first hydraulic load for introducing a first load pressure;

second load pressure induction means connected to the second hydraulic load for introducing a second load pressure;

first line pressure generating means inserted between the pressurized fluid source and the first valve means and connected to the first load pressure induction means for generating the first line pressure based on a supply pressure supplied from the pressurized fluid source and the first load pressure to supply the first valve means with the first line pressure;

second line pressure generating means inserted between the pressurized fluid source and the second valve means and connected to the second load pressure induction means for generating the second line pressure based on a supply pressure supplied from the pressurized fluid source and the second load pressure to supply the second valve means with the second line pressure; and a by-pass means for establishing communication between the first and second load pressure induction means for equalizing the first and second load pressures introduced from the first and second load pressure induction means while the vehicle travels in a straight manner.

It is possible that each of the first and second line pressure generating means comprises a pressure compensation valve having a check valve portion and a pressure reducing valve portion. In this case, the pressure reducing valve portion may have a load pressure feedback chamber and a supply pressure chamber opposing to respective ends of a pressure reduction valve body for displacing the pressure reducing valve body for establishing and blocking communication between the supply pressure chamber and the pressurized fluid source depending upon the load pressure introduced from a corresponding one of the first and second load pressure introducing means to generate a pilot pressure to be supplied to a discharge pressure control means. Also, it is desirable that the check valve portion comprises a valve opening side pressure chamber for acting a supply pressure of the pressurized fluid source in a valve opening direction and means for acting a force depending upon a pressure difference between the pressure of the load pressure feedback chamber and the pressure of the supply pressure chamber, for generating the first and second line pressures depending upon the supply pressure and the pressure difference.

The pressure reduction valve body of the pressure reducing valve portion may be adapted to be displaced by a pressure difference between the pressure of the load pressure feedback chamber and the pressure of the supply pressure chamber so as to displace in the valve opening direction when the pressure of the load pressure feedback chamber is higher than the pressure of the supply pressure chamber beyond a predetermined pressure difference to establish communication between the pressurized fluid source and the supply pressure chamber. Also, the pressure reduction valve portion may be provided with a supply side port communicating with the supply pressure chamber at the valve open position of the pressure reduction valve body and a feedback side port communicated with the load pressure feedback chamber, the supply side port of the first line pressure generating means is communicated with the supply side port of the second line pressure generating means and the feedback side ports of the first and second line pressure generating means are commonly connected to the discharge pressure control means. It is further possible that the pressure reducing valve portion is provided with a supply side port communicated with the supply pressure chamber at the valve open position of the pressure reducing valve body and a feedback side port communicated with the load pressure feedback chamber, a communication passage for communicating the feedback side port and the supply side port, and a check valve which is opened when the pressure of the feedback side port is higher than the pressure of the supply side port, is disposed in the communication passage.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

BEST MODE FOR IMPLEMENTING THE INVENTION

Figure 1:
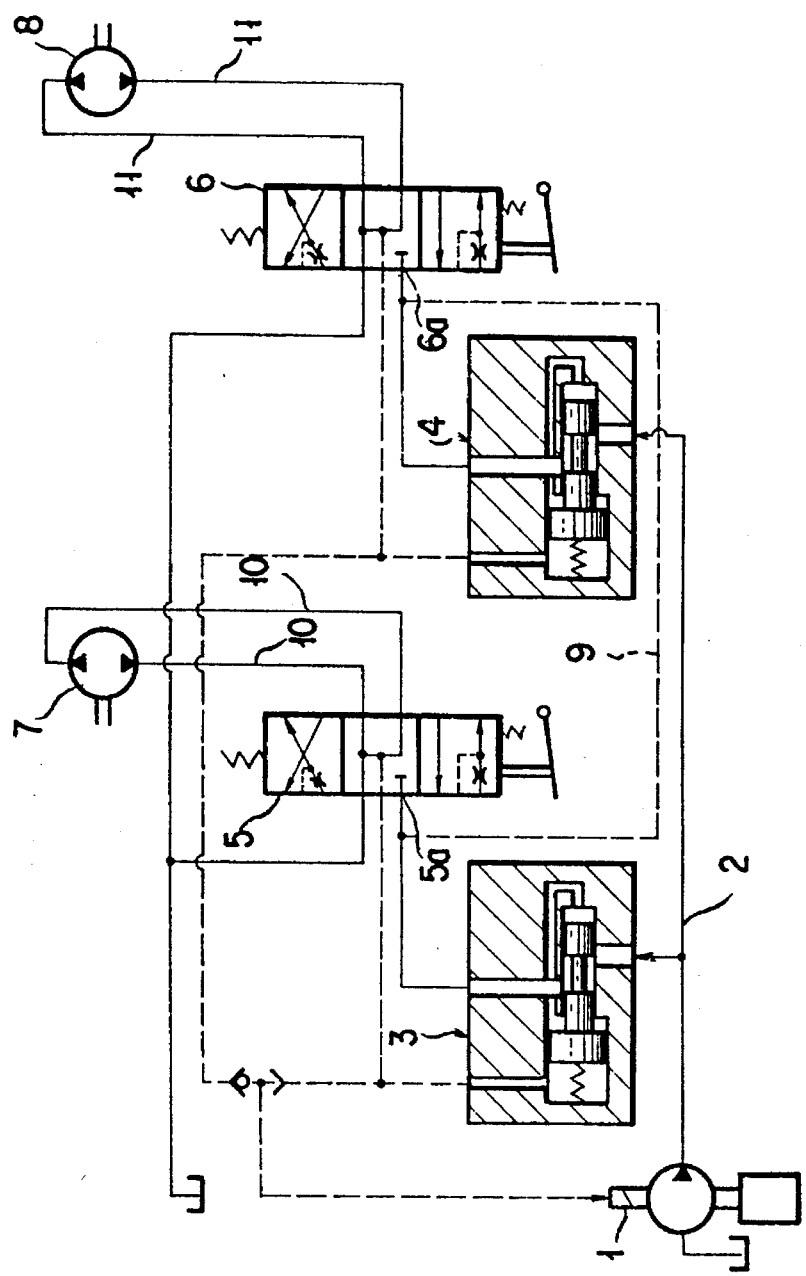
FIG. 1 is a hydraulic circuit diagram of the prior art.
Figure 2:
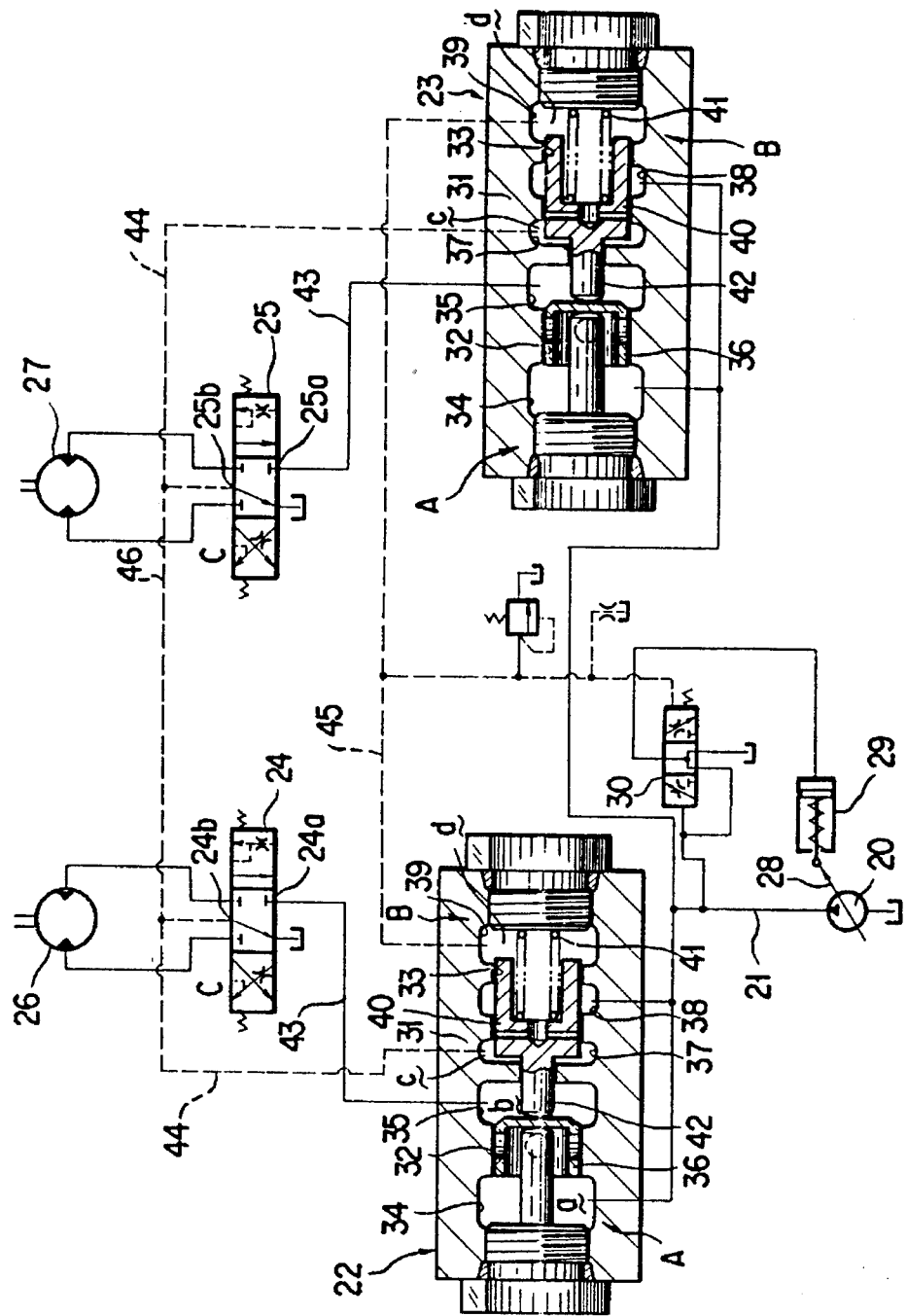
FIG. 2 is a hydraulic circuit diagram showing the first embodiment of the present invention.

The preferred embodiments of the present invention will be discussed hereinafter with reference to FIGS. 2 to 5. FIG. 2 shows the first embodiment of a hydraulic circuit according to the present invention. As shown in FIG. 2, for a discharge conduit 21 of a hydraulic pump 20, left and right pressure compensation valves 22 and 23 are provided in parallel. The outlets of these left and right pressure compensation valves 22 and 23 are connected to left and right hydraulic traveling motors 26 and 27 via left and right travelling valves 24 and 25.

The hydraulic pump 20 comprises a variable displacement type pump. The variable displacement type hydraulic pump 20 controls a discharge fluid amount by an angular position of a swash plate 28. Therefore, for an adjusting cylinder 29 for adjusting an angle of the swash plate 28, a pump discharge pressure is supplied through a pump adjusting direction control valve 30.

The left and right pressure compensation valves 22 and 23 have valve blocks 31. It should be noted that the constructions of the left and right pressure compensation valves 22 and 23 are mutually identical to each other. Accordingly, the following discussion for the valve blocks 31 is commonly applied to the left and right pressure compensation valves 22 and 23. In the valve blocks 31 of the left and right pressure compensation valves 22 and 23, a check valve receptacle bore 32 and a pressure reduction valve receptacle bore 33 are defined in alignment long an axis of the valve blocks 31. In the check valve receptacle bore 32, a check valve 36 for establishing and blocking communication between a pump port 34 and an outlet port 35 is disposed. The check valve 36 is depressed in a communicating direction by the pressure in the pump port 34 and in blocking direction by a pressure in the outlet port 35. By this check valve 36, a check valve portion A is formed. To the pressure reduction valve receptacle bore 33, first, second and third ports 37, 38 and 39 are opened, and in the bore 33 a pressure reduction valve spool 40 is disposed.

The pressure reduction valve spool 40 is depressed in a direction for blocking communication between the second port 38 and the third port 39 by a spring 41 having small spring force and the pressure at the third port 39. Also, by a pushing rod 42 provided on the pressure reduction valve spool 40, the check valve 36 is depressed in blocking direction. Furthermore, by the pressure at the first port 37, the pressure reduction valve spool 40 is depressed in a direction for establishing communication between the second port 38 and the third port 39. By this construction, a pressure reducing portion B of the pressure compensation valve is formed.

The pump port 34 of the check valve portion A and the second port 38 of the pressure reducing portion B are connected to the discharge conduit 21 of the hydraulic pump 20, respectively. On the other hand, the outlet port 35 of the check valve portion A is connected to inlet ports 24a and 25a of the left and right travelling valves 24 and 25 via passage 43. Also, the first port 37 of the pressure reducing portion is connected to load pressure detection ports 24b and 25b of the left and right travelling valves 24 and 25 via passages 44. The third port 39 is connected to a load pressure detecting conduit 45.

Namely, the left and right pressure compensation valves 22 and 23 have the check valve portions A and the pressure reducing valve portions B. The check valve 36 of the check valve portion A is depressed in the direction of opening by the inlet pressure chamber a and is depressed in the direction for blocking communication by the outlet pressure of a pressure chamber b. The output sides of the left and right pressure compensation valves 22 and 23 are connected to the inlet ports 24a and 25a of the left and right travelling valves 24 and 25. The pressure reduction valve portion B is depressed in the opening direction by the load pressure of the respective hydraulic traveling motor introduced into a pressure chamber c through a passage 44 for introducing load pressure, and depressed in the closing direction by a weak spring 41 and the outlet pressure introduced into a pressure chamber d. Also, the pressure reducing portion B is provided with the push rod 42 for depressing the check valve portion A in the closing direction. Each of the outlet sides of the pressure reducing portion B is communicated with load pressure detecting conduits 45, respectively, and the load detecting conduits 45 are communicated with a tank via throttle orifices.

The passages 44, 44 respectively connected to the load pressure detection ports 24b and 25b of the left and right travelling valves 24 and 25 are communicated with each other through a by-pass passage 46.

Accordingly, when the left and right travelling valves 24 and 25 are placed at forward traveling position C, the outlet sides of the left and right travelling valves 24 and 25 are communicated with load pressure detection ports 24b and 25b via the passages 44 and 44 and the by-pass passage 46. As a result, the fluid pressures to be supplied to the left and right hydraulic traveling motors 26 and 27 become equal to each other. Therefore, the revolution speed of the left and right hydraulic traveling motors 26 and 27 become equal to each other. Therefore, the straight traveling of the hydraulically driven vehicle can be compensated.

Figure 3:
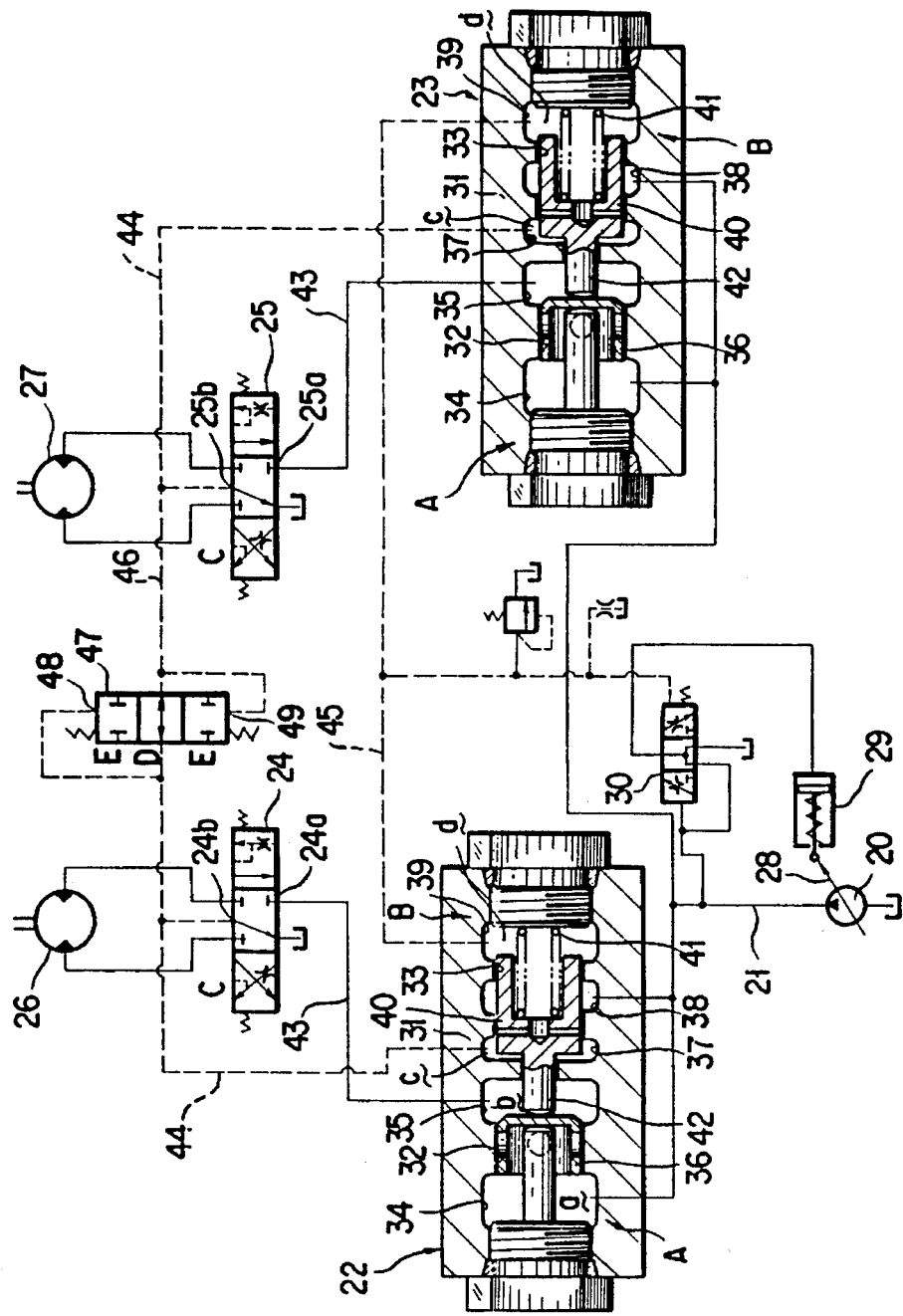
FIG. 3 is a hydraulic circuit diagram showing the second embodiment of the present invention.

FIG. 3 shows a hydraulic circuit diagram of the second embodiment of the present invention. It should be noted that, in the shown embodiment, the components common to the foregoing first embodiment will be represented by the same reference numerals and detailed description therefor is neglected. In the shown embodiment, an opening and closing valve 47 is provided in the by-pass passage 46. The opening and closing valve 47 is held in a communicating position D by a spring force of a not shown spring and is adapted to be switched into a blocking position E by a pressure difference acting on first and second pressure receiving portions 48 and 49.

By the construction set forth above, while the vehicle travels in a straight manner, the opening and closing valve 47 is placed at the communicating position D for compensation for straight traveling and upon turning left or right, the opening and closing valve 47 is placed at the blocking position E to permit a smooth left or right turn.

Figure 4:
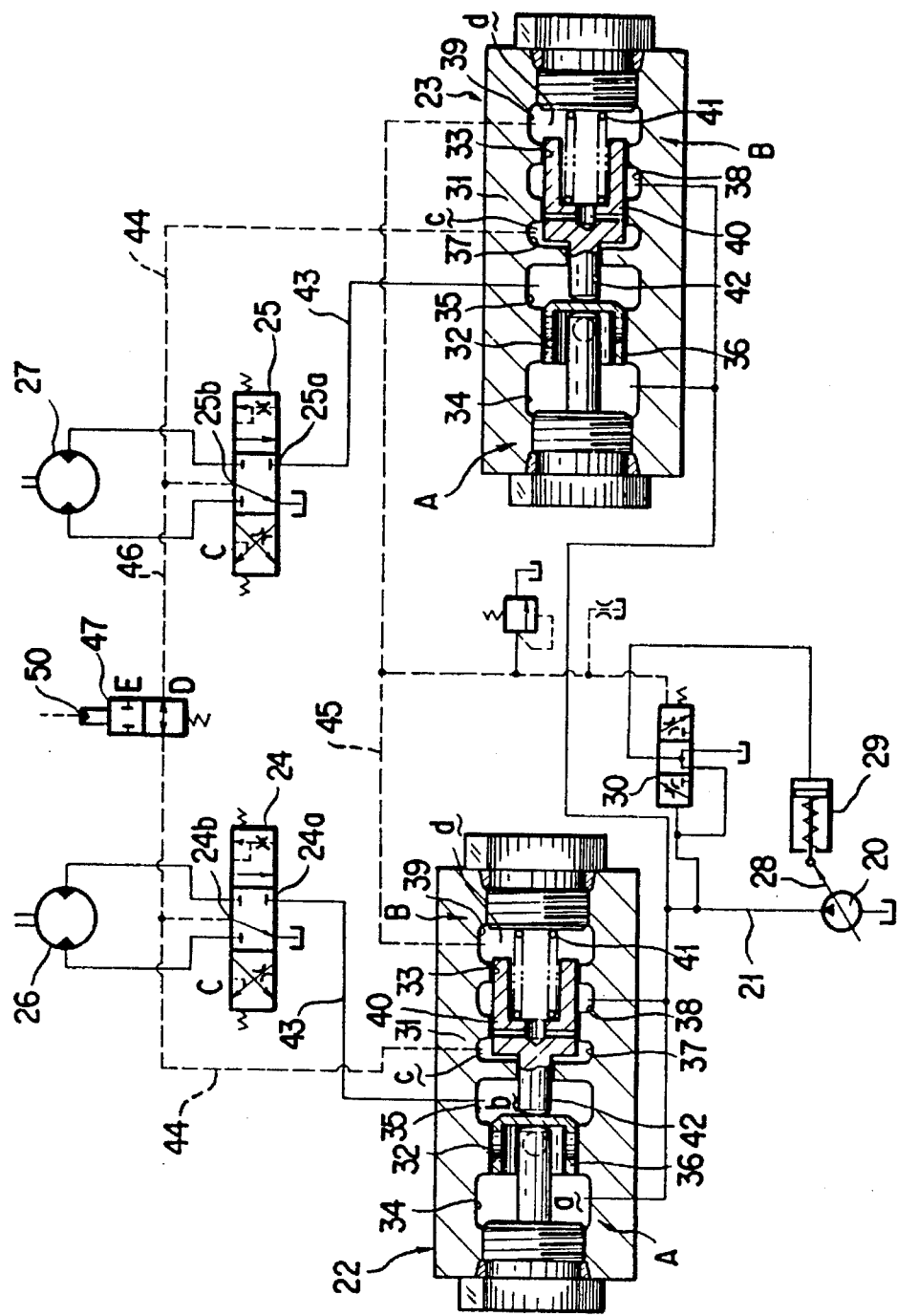
FIG. 4 is a hydraulic circuit diagram showing the third embodiment of the present invention.

FIG. 4 shows a hydraulic circuit diagram of the third embodiment of the present invention. Even in the shown embodiment, the components common to the foregoing first and second embodiments are shown by the same reference numerals and detailed description therefor is neglected. In the shown embodiment, the opening and closing valve 47 provided in the by-pass passage 46 is placed at the communicating portion D by a spring force and at the blocking position E by a pressure on a pressure receiving portion 50. The pressure is supplied to the pressure receiving portion 50 when the operational magnitudes of the left and right travelling valves 24 and 25 are different from each other. Even with the shown construction, compensation for straight traveling and smooth left or right turns can be enabled similarly to the foregoing second embodiment.

Figure 5:
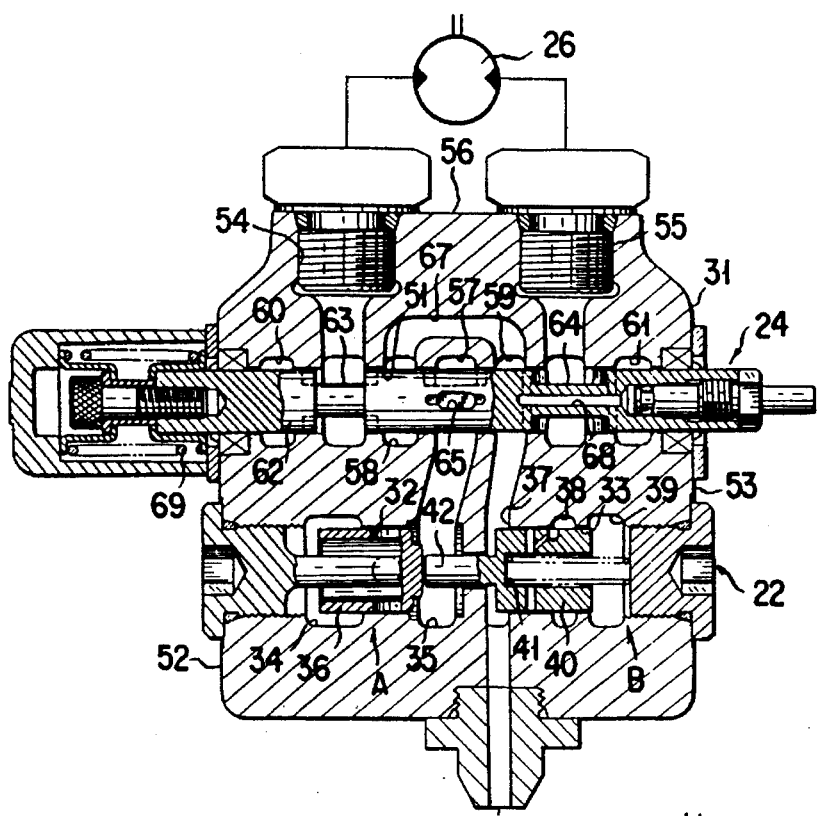
FIG. 5 is a section showing concrete construction of the present invention.
Figure 5:
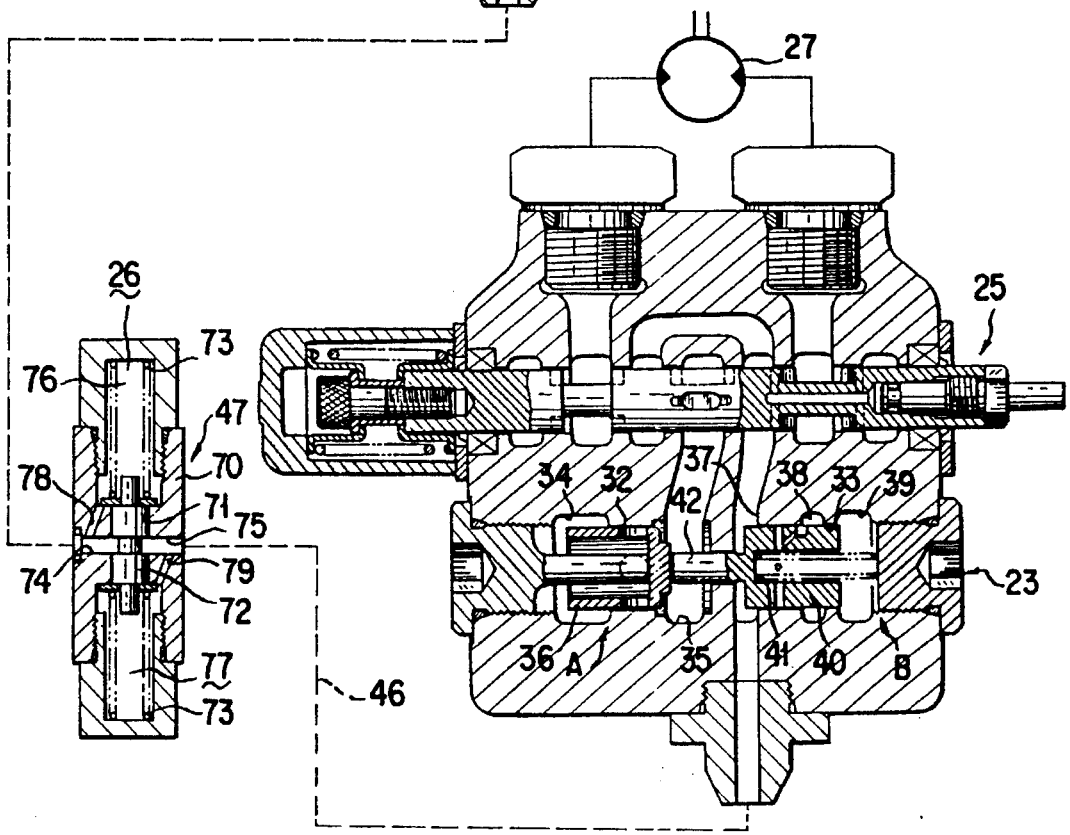

FIG. 5 is an illustration showing concrete construction of the pressure compensation valve and the opening and closing valve in the second embodiment of the hydraulic circuit. The valve blocks 31 are formed into substantially rectangular parallelepiped configuration. At the upper portion of the valve blocks 31, a spool bore 51 is formed with openings at left and right side surfaces. First and second actuator ports 54 and 55 opening to the spool bore 51 are formed in the upper surface 56. At the lower portion of the valve blocks 31, the check valve receptacle bore 32 opening to the left side surface 52 and the pressure reduction valve receptacle bore 33 opening to the right side surface 53 are formed in alignment on common axis.

In the valve blocks 31, an inlet port 57, first and second load pressure detection ports 58 and 59, the first and second actuator ports 54 and 55 and first and second tank ports 60 and 61, respectively, open to the spool bore 51. On the other hand, in a main spool 62 disposed within the spool bore 51, first and second small diameter portions 63 and 64 and an intermediate slit 65 are formed. Also, in the valve blocks 31, a fluid conduit 67 communicated with first and second load pressure detecting ports 58 and 59 is formed. In the main spool 62, a fluid passage 68 for establishing and blocking communication is formed. The main spool 62 is maintained at a neutral position by a spring 69 where respective ports are blocked and the second load pressure detecting port 59 and the second tank port 61 are communicated through the fluid passage 68. When the main spool 62 is shifted toward the right, a first pressurized fluid supply position is established, in which the second actuator port 55 and the second tank port 61 are communicated through the second smaller diameter portion 64, and the inlet port 57 and the second load pressure detection port 59 are communicated via the intermediate slit 65, the first actuator port 54 and the first load pressure detecting port 58 are communicated via the first smaller diameter portion 63, and the second load pressure detecting port 59 and the second tank port are blocked. When the main spool 62 is shifted toward left, a second pressurized fluid supply position is established, in which the first actuator port 54 and the first tank port 60 are communicated through the first smaller diameter portion 63, the inlet port 57 and the first load pressure detecting port 58 are communicated with the intermediate slit 65, the second actuator port 55 and the second load pressure detecting port 59 are communicated through the second smaller diameter portion 64, and the first load pressure detecting port 58 and the first tank port 60 are blocked.

The opening and closing valve 47 is constructed by disposing a spool 72 in a spool bore 71 of a valve body 70, maintaining the spool 72 with a pair of springs at a position establishing communication between a first communication port 74 and a second communication port 75, slidingly shifting to the position for blocking communication between the first communication port 74 and the second communication port 75 by a pressure difference between a pressure in a first pressure receiving chamber 76 and a pressure in a second pressure receiving chamber 77, establishing communication between the first communication port 74 and the first pressure receiving chamber 76 via a first fluid conduit 78, and establishing communication between the second communication port 75 and the second pressure receiving chamber 77 via the second fluid conduit 79.

Then, the first communication port 74 is communicated with the first port 37 of the left side pressure compensation valve 22 and the second communication port 75 is communicated with the first port 37 of the right side pressure compensation valve 23.

It should be noted that the pressure compensation valve may be constructed as disclosed in commonly owned copending U.S. patent application Ser. No. 08/044,205, filed on Apr. 8, 1993, International Patent Application No. PCT/JP93/00452, filed on Apr. 8, 1993, International Patent Application No. PCT/JP93/00459, filed on Apr. 9, 1993 and International Patent Application No. PCT/JP93/00724, filed on May 28, 1993. The disclosures of the above-identified U.S. patent application and PCT applications are herein incorporated by reference.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments within a scope encompassed and equivalents thereof with respect to the features set out in the appended claims.

We claim:

1. A compensation system for a hydraulic for a hydraulic circuit of a hydraulically driven vehicle for straight traveling, comprising:

left and right traveling valves connected to a pressurized fluid source at an inlet side via left side and right side pressurized fluid supply passages, connected to left and right hydraulic traveling motors at outlet sides and having load detection ports;

left and right pressure compensation valves arranged in respective pressurized fluid supply passages between said fluid pressure source and said traveling valves and having check valve portions for establishing and blocking communication between said fluid pressure source and said left and right traveling valves, and pressure reduction valve portions for lowering supply pressure supplied from said fluid pressure source, each said check valve portion being constructed to be applied an inlet pressure in a communication establishing direction and output pressure in a communication blocking direction each said pressure reduction valve portion being contacted with a respective check valve portion by a spring, pressure of a first pressure chamber being applied for establishing communication between the inlet side and the outlet side and to shift the pressure reduction valve portion in a direction away from the check valve portion, and pressure of a second pressure chamber being applied for blocking communication between the inlet side and the outlet side and to shift the pressure reduction valve portion in a blocking direction of said check valve portion;

load pressure detecting passage for connecting one of the pressure chambers of said left side pressure compensation valve to a load pressure detecting port of the left side traveling valve and for connecting one of the pressure chambers of said right side pressure compensation valve to a load detecting port of the right side traveling valve; and by-pass passage for connecting said load pressure detecting ports of the left and right traveling valves.

2. A compensation system for a hydraulic circuit of a hydraulically driven vehicle for straight traveling as set forth in claim 1, wherein an opening and closing valve is provided in said by-pass passage for controlling, establishing and blocking of communication between said load pressure detecting ports.

3. A compensation system for a hydraulic circuit of a hydraulically driven vehicle for straight traveling, in a pressurized fluid supply system for the hydraulically driven vehicle provided with a plurality of pressure compensation valves connected to a pump discharge line of a hydraulic pump in parallel, traveling valves connected to outlet sides of respective pressure compensation valves being connected to left and right hydraulic driving motors for supplying pressurized fluid respectively, said system comprising:

said pressure compensation valve being constructed with a check valve portion for communicating and blocking between a pump discharge line and an inlet port of said traveling valve and a pressure reducing portion for reducing pump discharge pressure;

said check valve portion being constructed to be moved in a valve opening direction by an inlet pressure in a valve closing direction by an outlet pressure;

said pressure reducing valve being contacted with said check valve portion by means of a spring, responsive to a pressure in one of first and second pressure chambers to establish communication between the inlet side and outlet side and to be biased in a direction away from said check valve and responsive to a pressure in the other of said first and second pressure chambers to block communication between the inlet side and the outlet side and to bias said check valve portion in a valve closing direction; and one of the first and second pressure chambers of said left side pressure compensation valve being connected to a load pressure detecting port of said left side traveling valve, one of the first and second pressure chambers of said right side pressure compensation valve being connected to a load pressure detecting port of said right side traveling valve and, said load pressure detecting ports of said left and right traveling valves being connected by a by-pass passage.

4. A compensation system for a hydraulic circuit of a hydraulically driven vehicle for straight traveling comprising:

a valve block;

left and right traveling valves constructed by forming spool bores, check valve receptacle bores and reduction valve receptacle bores in said valve block, forming a pump port, first and second load pressure detecting ports, first and second actuator ports and first and second tank ports opening to each of said spool bores, and slidably disposing main spools in said spool bores for selectively establishing and blocking communication between respective ports;

check valve portions each being formed by forming a first port opening to said check valve receptacle bore and a fluid passage for communicating said check valve receptacle bore with said pump port in said valve block, and inserting a spool in said check valve receptacle bore for establishing and blocking communication between said first port and said fluid passage and stopping at the blocking position;

pressure reduction valve portions each being formed by forming second and third ports opening to said pressure reducing valve receptacle bore, forming first and second pressure chambers opposing to both ends of a spool disposed in said pressure reducing valve receptacle bore, communicating said first pressure chamber with said second load pressure detecting port, communicating said second pressure chamber with said third port, and contacting the spool received within said pressure reducing valve receptacle bore with said check valve portion and biasing the same in a valve closing direction of said check valve portion;

pressure compensation valves each being formed by said check valve portion and said pressure reducing valve portion;

said spool of said pressure reducing valve portion being formed into a configuration for establishing communication between said first pressure chamber and said second port when it is slid against the spring force of said spring by the pressure of said first pressure chamber;

one of said pressure chambers of said left side pressure compensation valve being connected to the load pressure detecting port of the left side traveling valve, one of said pressure chambers of said right side pressure compensation valve being connected to the load pressure detecting port of the right side traveling valve and said load pressure detecting ports being connected through a by-pass passage.

5. In a pressurized fluid supply system for distributing pressurized fluid supplied from a pressurized fluid source to supply first and second line pressures to at least a first hydraulic load and a second hydraulic load, a compensation system for a hydraulic circuit of a hydraulically driven vehicle for straight traveling comprising:

first valve means for supplying said first line pressure to said first hydraulic load;

second valve means for supplying said second line pressure to said second hydraulic load;

first load pressure induction means connected to said first hydraulic load for introducing a first load pressure;

second load pressure induction means connected to said second hydraulic load for introducing a second load pressure;

first line pressure generating means inserted between said pressurized fluid source and said first valve means and connected to said first load pressure induction means for generating said first line pressure based on a supply pressure supplied from said pressurized fluid source and said first load pressure to supply said first valve means with said first line pressure;

second line pressure generating means inserted between said pressurized fluid source and said second valve means and connected to said second load pressure induction means for generating said second line pressure based on a supply pressure supplied from said pressurized fluid source and said second load pressure to supply said second valve means with said second line pressure; and a by-pass means for establishing communication between said first and second load pressure induction means for equalizing said first and second load pressures introduced from said first and second load pressure induction means while the vehicle travels in a straight manner.

6. A system as set forth in claim 5, wherein each of said first and second line pressure generating means comprises a pressure compensation valve having a check valve portion and a pressure reducing valve portion.

7. A system as set forth in claim 6, wherein said check valve portion comprises a valve opening side pressure chamber for acting a supply pressure of said pressurized fluid source in a valve opening direction and means for acting a force depending upon a pressure difference between the pressure of said load pressure feedback chamber and the pressure of said supply pressure chamber, for generating said first and second line pressures depending upon the supply pressure and said pressure difference.

8. A system as set forth in claim 6, wherein said pressure reducing valve portion has a load pressure feedback chamber and a supply pressure chamber opposing to respective ends of a pressure reduction valve body for displacing said pressure reducing valve body for establishing and blocking communication between said supply pressure chamber and said pressurized fluid source depending upon the load pressure introduced from a corresponding one of said first and second load pressure introducing means to generate a pilot pressure to be supplied to a discharge pressure control means.

9. A system as set forth in claim 8, wherein said pressure reduction valve body of said pressure reducing valve portion is adapted to be displaced by a pressure difference between the pressure of said load pressure feedback chamber and the pressure of said supply pressure chamber so as to displace in the valve opening direction when said pressure of the load pressure feedback chamber is higher than the pressure of said supply pressure chamber beyond a predetermined pressure difference to establish communication between said pressurized fluid source and said supply pressure chamber.

10. A system as set forth in claim 9, wherein said pressure reduction valve portion is provided with a supply side port communicating with said supply pressure chamber at the valve open position of said pressure reduction valve body and a feedback side port communicated with said load pressure feedback chamber, said supply side port of said first line pressure generating means is communicated with said supply side port of said second line pressure generating means and said feedback side ports of said first and second line pressure generating means are commonly connected to said discharge pressure control means.

11. A system as set forth in claim 9, wherein said pressure reducing valve portion is provided with a supply side port communicated with said supply pressure chamber at the valve open position of said pressure reducing valve body and a feedback side port communicated with said load pressure feedback chamber, a communication passage for communicating said feedback side port and said supply side port, and a check valve which is opened when the pressure of said feedback side port is higher than the pressure of said supply side port, is disposed in said communication passage.

12. A system as set forth in claim 8, wherein said pressure reducing valve portion is provided with a supply side port communicated with said supply pressure chamber at the valve open position of said pressure reducing valve body and a feedback side port communicated with said load pressure feedback chamber, a communication passage for communicating said feedback side port and said supply side port, and a check valve which is opened when the pressure of said feedback side port is higher than the pressure of said supply side port, is disposed in said communication passage.

* * * * *